(No Model.)
F. SULLEY & W. E. DOWSON.
TIRE FOR VEHICLE WHEELS.
No. 541,396.  Patented June 18, 1895.
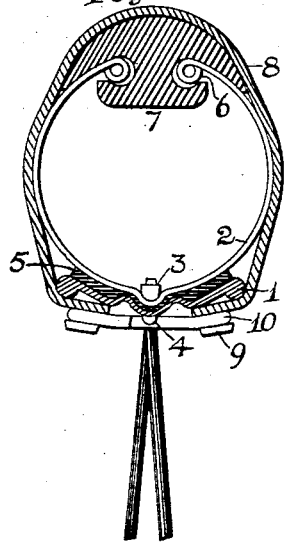
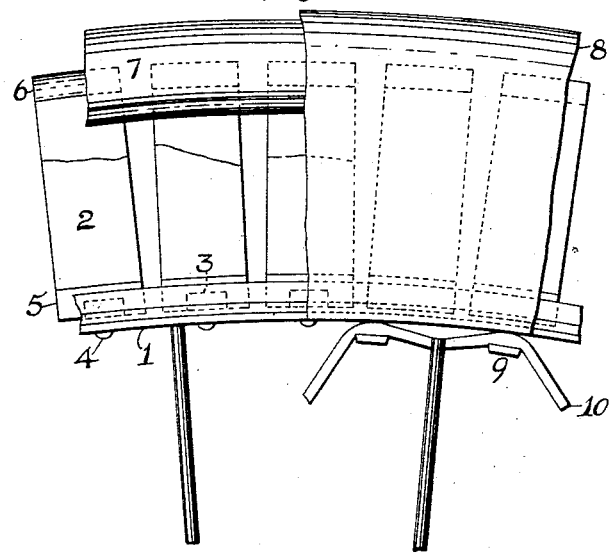
Witnesses:
J. W. Gough C.E.
J. H. Gaugh
Inventors.
Frank Sulley
William Enfield Dowson

UNITED STATES PATENT OFFICE.

FRANK SULLEY AND WILLIAM ENFIELD DOWSON, OF NOTTINGHAM, ENGLAND.

TIRE FOR VEHICLE-WHEELS.

SPECIFICATION forming part of Letters Patent No. 541,396, dated June 18, 1895.

Application filed November 13, 1894. Serial No. 528,628. (No model.)

*To all whom it may concern:*

Be it known that we, FRANK SULLEY, machinist, residing at 147 Forest Road, Nottingham, and WILLIAM ENFIELD DOWSON, of the firm of Farmer & Dowson, lace manufacturers, Sherwood Street, Nottingham, England, subjects of the Queen of Great Britain, have invented certain new and useful Improvements in Bicycles and Like Vehicles, of which the following is a specification, reference being had to the accompanying drawings.

This invention relates to bicycles and like vehicles and is illustrated in the accompanying drawings, in which—

Figure 1 shows a sectional view of the tire of a wheel for a bicycle or like vehicle, and Fig. 2 a side view of portion of the same.

The corresponding parts in each figure are indicated by the same numbers where necessary.

Each tire consists of a rim 1 formed with a recess at the center of its width to receive a series of open ended spring steel rings 2, each bent to form a groove interiorly across its width in which a screw threaded nut 3 rests. A screw 4 is passed through a hole in the rim 1 through a piece of felt 5 and through a hole in the groove of the ring to engage with the nut 3 and clamp the rim felt and ring together. The outer ends of each ring are turned inward at 6 to engage with grooves in the sides of an india rubber band or ring 7.

The outer edges of the rings 2 may be rounded to prevent them cutting the inside of a cover or outer case 8. The rings may be plated with nickel, tin or other suitable metal to prevent oxidation.

The outer case is of the usual construction formed of canvas covered with india rubber and provided near each edge with studs 9 round which laces 10 are passed and under the rim 1 to hold the outer case tight over the whole series of rings 2 and the india rubber band 7.

What we claim is—

In a tire for the wheels of bicycles and other vehicles, the combination of the centrally recessed rim 1, the rubber band or ring 7 having grooves on each side, the series of open ended steel spring rings 2 centrally engaged in the recess of the rim and having their ends engaged in the side grooves of the rubber band, the felt packing 5 between the rim and the series of rings supported thereon, the nuts 3 and bolts 4 securing together the rim, rings and packing, and the covering 8 laced onto the tire, substantially as shown and described.

In witness whereof we have hereunto set our hands this 27th day of October, 1894.

FRANK SULLEY.
WILLIAM ENFIELD DOWSON.

Witnesses:
H. W. GOUGH,
J. H. GOUGH.